June 2, 1959   S. J. GARTNER   2,889,057
MICA TRANSFER MECHANISM
Filed June 5, 1957   3 Sheets-Sheet 1
FIG-2
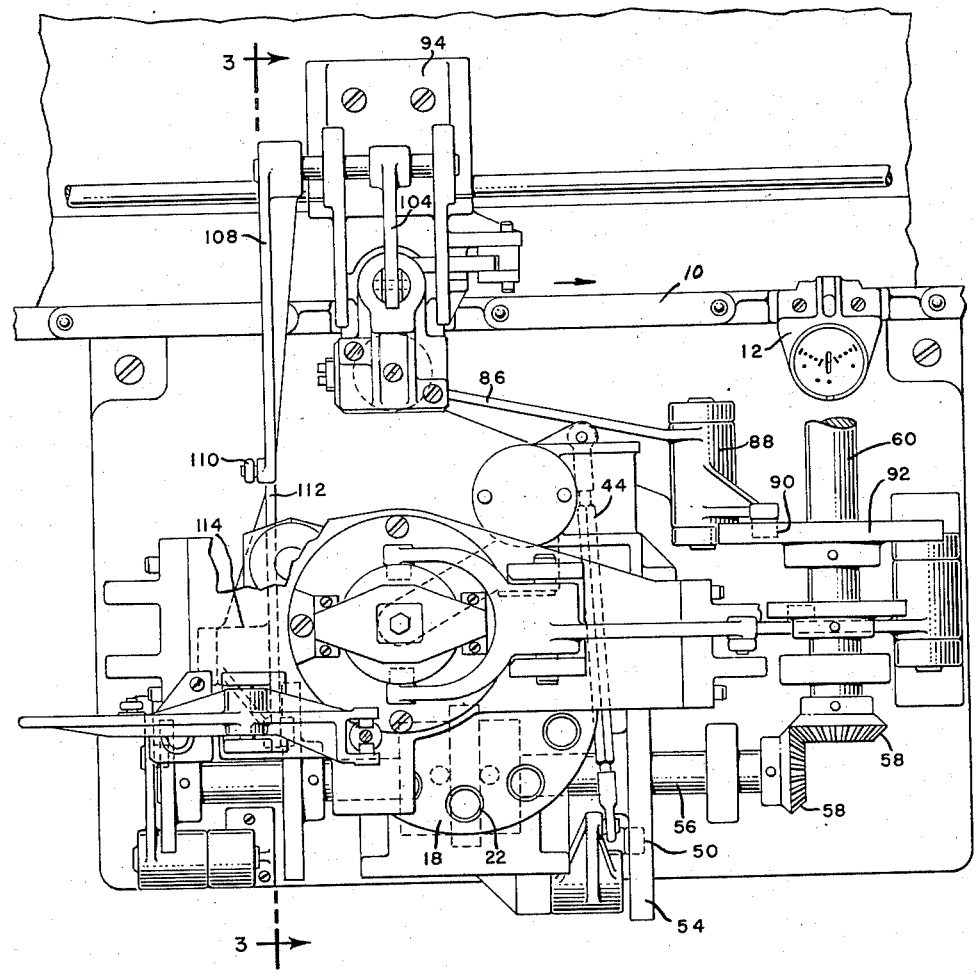
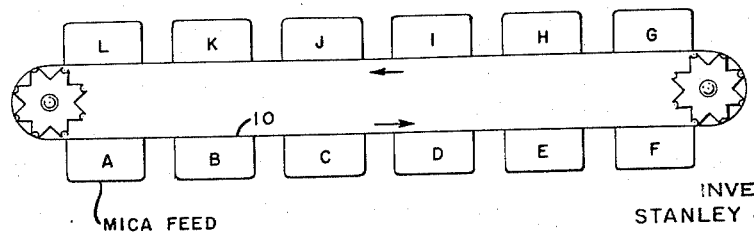
FIG-1
MICA FEED
INVENTOR
STANLEY J. GARTNER
BY Michael Hertz
ATTORNEY INVENTOR
STANLEY J. GARTNER
BY Michael Hertz,
ATTORNEY June 2, 1959  S. J. GARTNER  2,889,057
MICA TRANSFER MECHANISM
Filed June 5, 1957  3 Sheets-Sheet 3
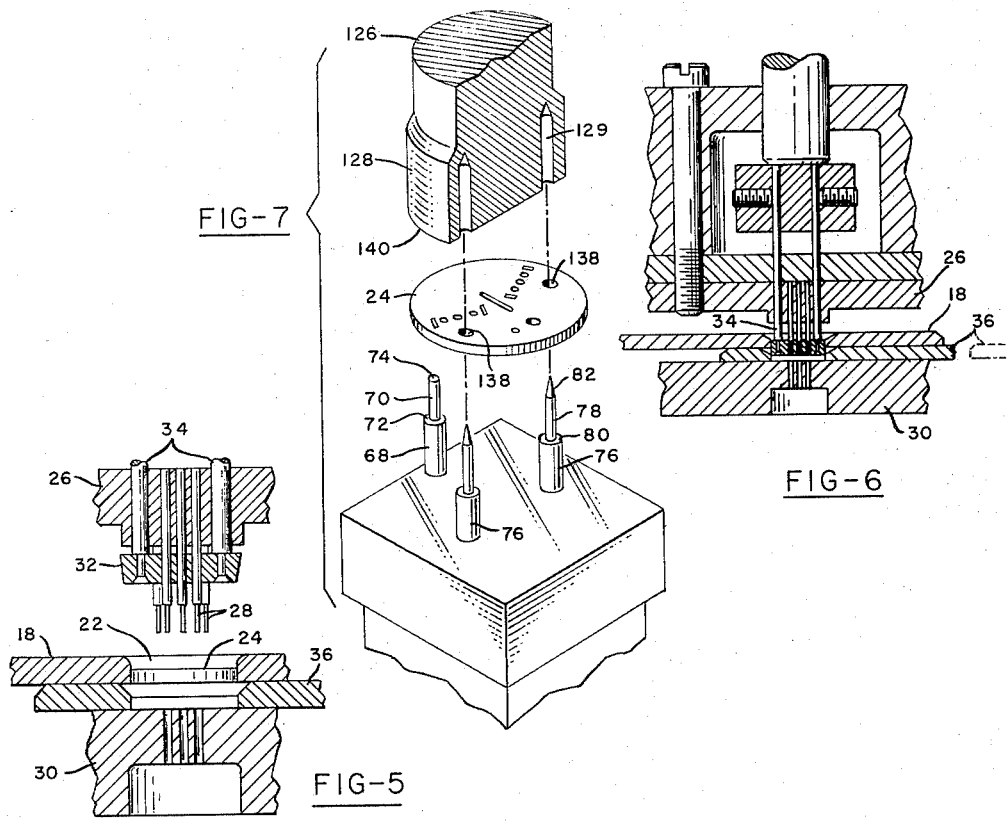
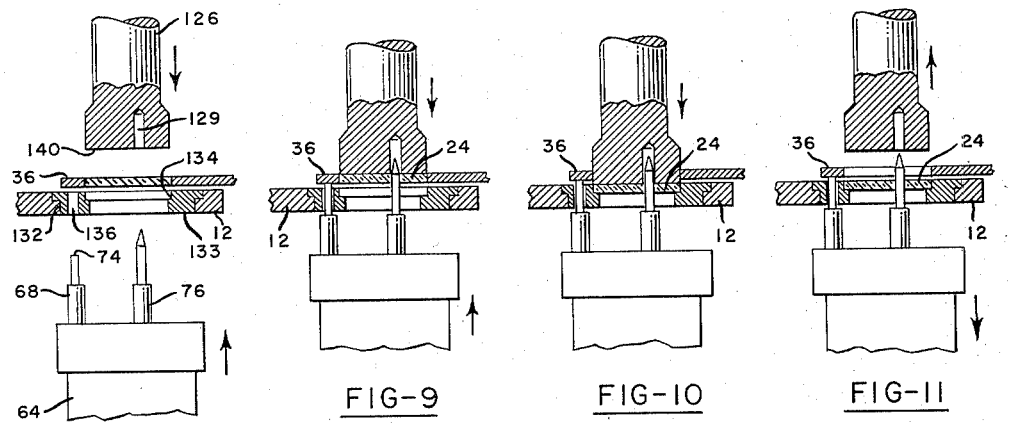
INVENTOR
STANLEY J. GARTNER
BY Michael Hertz,
ATTORNEY

United States Patent Office 2,889,057
Patented June 2, 1959

2,889,057

MICA TRANSFER MECHANISM

Stanley Jacob Gartner, Emporium, Pa., assignor to Sylvania Electric Products Inc., a corporation of Massachusetts Application June 5, 1957, Serial No. 663,723

9 Claims. (Cl. 214—1)

This invention relates to means for feeding individual insulating members such as mica discs, from a loaded turret to its proper position in an indexible holder, as part of automatic mechanism for the assembly of an electron tube.

An object of the invention is to provide mechanism which shall be capable of rapid operation, with precision as to insertion of the mica disc in its indexible receiving holder. It is a further object of the invention to provide novel precision transfer mechanism, particularly where the delivery and receiving stations are at different elevations.

Other objects will be apparent upon consideration of the specification.

The invention will be understood by considering the following specification when taken in conjunction with the accompanying drawings in which:

Fig. 1 is a diagrammatic view of the machine layout indicating the mica disc feed station A, particularly described and claimed herein.

Fig. 2 is a plan view of the mechanism at the mica feed station and showing a transfer blade and mechanism for transferring a mica disc from a turret to its holder on the conveyor.

Fig. 5 is a sectional view of a mica punching die used to punch apertures in the mica disc in the last turret position, showing also a portion of the turret and transfer blade.

Fig. 6 is a view as in Fig. 5 but showing the upper die member in the punching position.

Fig. 7 is a view of mechanism to insure accurate positioning of the mica disc in its holder on the conveyor.

Figs. 8 to 11 depict the positioning mechanism of Fig. 5 at various positions in transferring a mica disc from the transfer blade to the mica disc holder on the conveyor.

Figure 3:
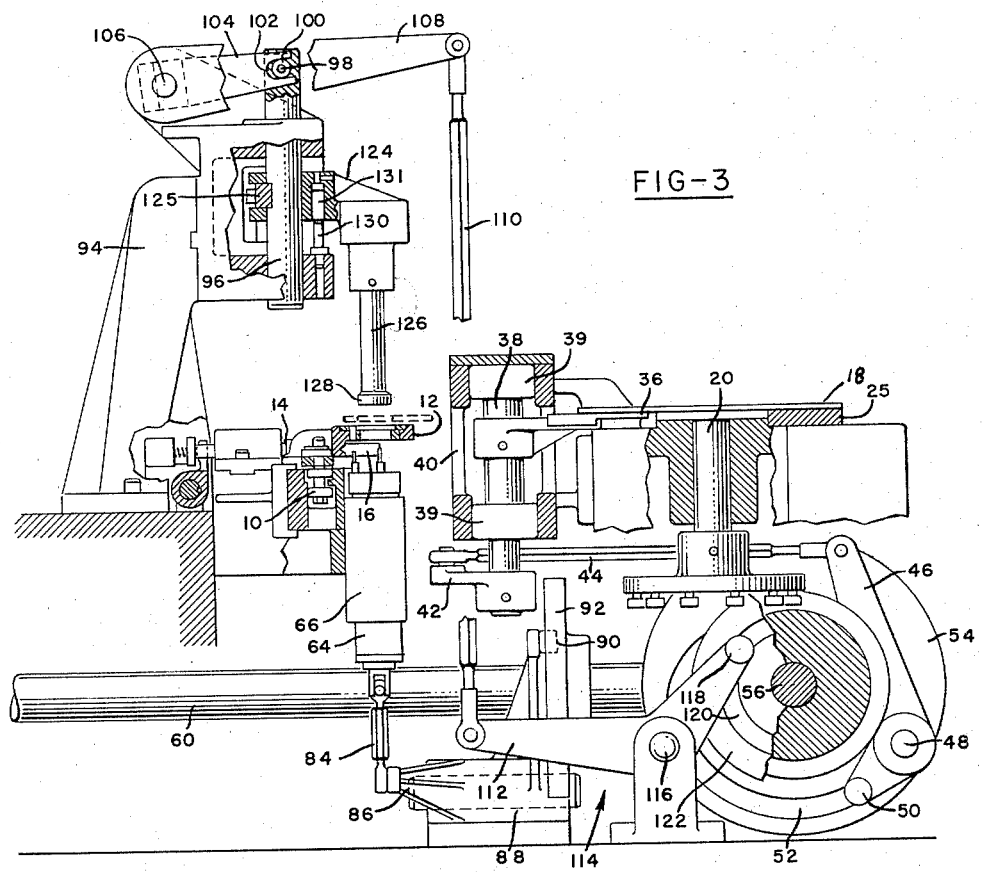
Fig. 3 is a sectional view taken along line 3—3 of Fig. 2 showing the mica disc feed turret, the transfer blade and a portion of an automount machine with which it is associated.
Figure 4:
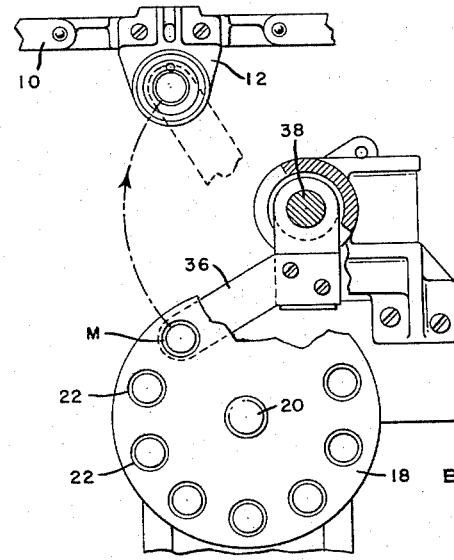
Fig. 4 is a fragmentary plan view of the mica disc feed turret, the transfer blade and a fragment of a conveyor chain having connected thereto a holder for the mica.

Referring to the figures in greater detail, in Fig. 1 there is diagrammatically illustrated a machine for automatically assembling mounts at successive stations indicated as A, B, C, etc., the machine comprising an endless conveyor 10 having holders 12, see Figs. 3 and 4, spaced therealong, which holders are indexible to the various stations. A holder centering and retaining device in the form of a pin 14 at each station engages a recess in the back of the block as it is moved by the conveyor to a station to hold the same against a fixed abutment block 16 while it is at any of the stations. Since the matter just described is not material to the understanding of the invention, except as set forth, no further details need be described.

At the mica feed station there is a rotary turret 18 pivoted at 20 and having a series of mica receiving openings 22 spaced near its periphery, see Figs. 2 and 4. By means of appropriate mechanism or by an operator, unperforated mica discs are inserted into the turret mica receiving openings, indexed, and punched prior to transfer to the mica holders 12 on the endless conveyor 10. Said mechanism is clearly described in the copending application of Henry W. Roeber for Punch Press and Stripper, filed contemporaneously herewith and assigned to the same assignee as the instant application.

For purposes of clarity however, the following brief description will serve to outline the operations on the mica while it is associated with the turret.

Unpunched mica discs 24 are placed, either manually or otherwise into the mica receiving openings 22 in the turret 18. A stationary mica support ring 25 underlies the turret openings to prevent the micas from falling through the openings in the turret. The turret is then indexed in synchronism with the conveyor by means of any conventional form of drive, for example via drive shaft common to the two and driving two Geneva driving mechanisms or equivalent, one for indexing the conveyor and the other for indexing the turret.

Each time the turret is indexed, a die punches holes in the mica disc 24 in turret position M and just prior to its transfer to the conveyor holder 12. The punch consists of an upper die member 26, which carries piercing members 28 and cooperates with a lower die member 30.

The punching is done in the following manner: when the turret has come to rest, a pad member 32 is lowered by means of rods 34, against mica 24 to force the same from its position in the turret 18, into a circular opening in the transfer blade 36, located beneath the turret and immediately above the lower die member 30. The mica support ring 25 is circular and underlies the positions 22 on the turret, but is cut away at station M to permit movement of the transfer blade 36 between the turret and the lower die member, to thereby receive the mica disc. The downward motion of the mica disc is arrested by the presence of lower die member 30. The punch 26 is then lowered, whereby the piercing members 28 punch through the mica. The upper die 28 and pad 32 are then retracted. The mica disc is thus pierced as shown in Fig. 7 and is held in the transfer blade 36.

The mica disc is next transferred to a position above the holder 12 which is at station A and which holder is accurately held in position to receive the disc by means of the pin 14 and fixed abutment block 16, previously described.

During transfer, the mica disc is held in the free end of the transfer blade 36 as shown in Figs. 4, 8 and 9. This blade is adapted to pivot on a shaft 38, Fig. 3, held in bearings 39 on a fixed support 40. At the lower end of the shaft 38 is an arm 42, having connected thereto a connecting rod 44 the other end of which is connected to the end of one arm 46 of a bell crank 47 pivoted to the frame at 48 at the end of the other arm of the bell crank is a cam follower 50, adapted to ride in a groove 52 in the cam 54. The cam 54 is fixed to a shaft 56 which, see Fig. 2, through bevel gears 58 is driven by a shaft 60 driven in synchronism with the main continuous drive for the conveyor.

When the mechanism just described has effected a swinging motion of the loaded transfer blade 36 into position over the mica holder 12, another mechanism unloads the mica disc from the transfer blade and accurately positions it to be carried by the holder 12 to permit subsequent mounting of various tube parts thereon.

The unloading mechanism consists of three individual portions: (1) an upwardly moving guiding, supporting and positioning means; (2) a downwardly moving mica ejecting mechanism; and (3) at temporarily fixed mica receiving means. These will now be described.

Firstly, the upwardly moving guiding, supporting and positioning means consists of a vertical rectangular bar 64 slidably disposed within a stationary outer conforming casing 66. The top of the movable bar carries a vertical stop pin 68 having a reduced diameter portion 70, a shoulder 72 and a flat end 74. Also mounted vertically in the top of the movable bar 64 are two guide pins 76, also having reduced diameter portions 78, shoulders 80, but terminating in pointed ends 82. The lower end of bar 64 is connected to a connecting rod 84, the other end of which is connected to one arm 86 of a second bell crank 88. The other arm of the bell crank carries a cam follower 90 which rides in a cam groove, not shown, in a locator cam 92 secured to the shaft 60.

Secondly, the downwardly moving mica ejecting mechanism is located above the mica receiving holder 12 and is supported by a standard 94. Vertically reciprocable within the upper portion of the standard is a shaft 96. Through the upper end of this shaft is a pin 98, carrying a roller 100 which is engaged within a slot 102 in the end of an arm 104, which is fastened at its other end to a shaft 106. To this shaft is also fastened one end of a driving arm 108, the other end of which is connected to a rod 110. The other end of this rod is connected to one arm 112 of a third bell-crank 114 pivoted at 116, the other arm of which carries a cam follower 118 which rides in a groove 120 of a cam 122 which is secured to the shaft 56.

The reciprocatable shaft 96 has nonrotatably affixed near its central portion a block 124 by any appropriate and well known means such as a key 125. Connected to the block 124 is a vertical rod 126, located directly over the vertically movable bar 64, and having an enlarged end 128, cylindrical in shape but of a diameter slightly smaller than the mica receiving aperture in the transfer blade 36, so that it may pass freely therethrough. The end 128 of the rod is also provided with a pair of bores 129, to receive portions 78 of guide pins 76. Rotation of shaft 96 relative to its bearings is prevented by guiding pin 130 on the bearing in bore 131 in the block 124 thus insuring alignment of rod 126 with the transfer arm aperture and also of the bores therein with the pins 76. The shape of the groove 120 in cam 122 determines the character of motion that rod 126 will partake.

Thirdly, the temporarily fixed mica receiving means is the holder 12; see Figs. 3, 4 and 8 to 11. The holder 12 is provided with a circular flanged opening 132, within which is suitably nonrotatably secured a mica holding ring 133, provided with a seat 134 for the micas. The ring 133 is also provided with a bore 136 to receive the small diametered portion 70 of stop pin 68.

The transfer operation will now be described. After the action of cam 54 has moved the loaded transfer blade or transporting mechanism 36 from its position beneath the turret or movable mica disc storage means 18 into position over the mica receiving means or holder 12, cams 92 and 122 effect the upward movement of bar 64 and the downward movement of rod 126 toward each other, and also toward the transfer blade, see Figs. 3, 7 and 8. The bar and rod continue to move toward each other, the stop pin 68 engaging the bore 136 in the ring 133 and the guide pins 76 engaging the holes 138 in the mica 24, thereby guiding the mica and insuring its accurate positioning in the holding ring 133. The bar 64 continues moving upwardly until the flat end 74 of the stop pin 68 engages the under-side of the transfer blade 36, and then stops. The stop pin thus supports the transfer blade. At approximately this time, the guide pins 76 commence to engage the bores 129 in the downwardly moving rod 126. The end face 140 of rod 126 then engages the top face of the mica 24 and forces it out of the transfer blade and into the seat 134 of holding ring 133, see Fig. 10; during this time the transfer blade is supported at one end by the stop pin 68. The mica disc is now accurately positioned in the holder. The rod 126 then is raised and a short while thereafter the bar member 64 begins to lower, so that the holder may be indexed to subsequent positions, B, C, D, etc., where various tube parts will be assembled with the mica.

What is claimed is:

1. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means engaging both sides of the disc for positively transferring the disc from the transfer arm to the receiving member.

2. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member.

3. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member, one of said members of the pair having a vertical tapered guide pin engageable with an opening in the disc to ensure registration of the disc with the opening in the holder.

4. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member, one of said members of the pair having a vertical tapered guide pin engageable with an opening in the disc to ensure registration of the disc with the opening in the holder, the other of said members of the pair having an aperture registering with the guide pin.

5. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member one of said members of the pair having a vertical blunt pin engageable with the arm in its position over the receiving means to prevent bending of the arm during transfer of the disc from the arm to the receiving member.

6. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member, one of said members of the pair having a vertical blunt pin engageable with the arm in its position over the receiving means, said receiving member having an aperture therethrough for the accommodation of said blunt pin.

7. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and movable toward each other to force the disc from the transfer arm to the receiving member, one of said members of the pair having a vertical tapered guide pin engageable with an opening in the disc to ensure registration of the disc with the opening in the holder and the other of said members having a vertical blunt pin engageable with the arm in its position over the receiving member to prevent bending of the arm during transfer of the disc from the arm to the receiving member.

8. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and both movable toward each other to force the disc from the transfer arm to the receiving member.

9. A transfer mechanism comprising a mica disc storage means provided with a discharge opening, a swingable transfer arm having an opening at the free end thereof positionable beneath the storage means with the said openings in registration, means for transferring a disc from the storage means into the opening in the arm, a receiving member below the level of the transfer arm and having a disc receiving opening registering with the opening in the transfer arm in a second position of the arm wherein the arm is above the receiving member, and means for transferring the disc from the transfer arm to the receiving member, said last transfer means comprising a pair of members on opposite sides of the receiving member and both movable toward each other with one of the members of the pair engaging the disc prior to the other members of the pair to force the disc from the transfer arm to the receiving member.

References Cited in the file of this patent

UNITED STATES PATENTS

| | | |
|---|---|---|
| 867,834 | Neureuther | Oct. 8, 1907 |
| 2,762,046 | Wright et al. | Sept. 11, 1956 |